United States Patent
Suzuki

[19]

[11] Patent Number: 6,097,372
[45] Date of Patent: Aug. 1, 2000

[54] DATA INPUT DEVICE

[75] Inventor: Katsutoshi Suzuki, Fukushima-ken, Japan

[73] Assignee: Alps Electric Co., Ltd., Tokyo, Japan

[21] Appl. No.: 09/089,812

[22] Filed: Jun. 3, 1998

[30] Foreign Application Priority Data

Jun. 5, 1997 [JP] Japan ................................. 9-148242
Apr. 3, 1998 [JP] Japan ................................. 10-092008

[51] Int. Cl.$^7$ ............................................. G09G 5/08
[52] U.S. Cl. ........................ 345/167; 345/162; 345/123
[58] Field of Search .................................. 345/156, 157, 345/158, 163, 164, 165, 167, 169, 123, 341; 348/734; 463/37.38; 278/148 B

[56] References Cited

U.S. PATENT DOCUMENTS

| | | | |
|---|---|---|---|
| 4,839,805 | 6/1989 | Pearson, Jr. et al. ................... | 345/167 |
| 5,404,152 | 4/1995 | Nagai ...................................... | 345/157 |
| 5,473,344 | 12/1995 | Bacon et al. ............................. | 345/163 |
| 5,491,497 | 2/1996 | Suzuki ..................................... | 345/157 |
| 5,521,617 | 5/1996 | Imai et al. ............................... | 345/167 |
| 5,771,038 | 6/1998 | Wang ....................................... | 345/163 |
| 5,917,473 | 6/1999 | Yeh ......................................... | 345/163 |

*Primary Examiner*—Lun-Yi Lao
*Attorney, Agent, or Firm*—Brinks Hofer Gilson & Lione

[57] ABSTRACT

In a data input device, an X-encoder 2 and a Y-encoder 3 are driven by a track ball 1 called a track ball and pulse outputs can be obtained from the respective encoders. Switches SW1, SW2, SW3 and SW4 are disposed around the track ball 1. When the track ball 1 is rolled about a Z-axis by a finger F while depressing a peripheral portion of the track ball 1 with the finger F, the finger F successively touches the switches SW1, SW2, SW3 and SW4. At the time, since the outputs from the X-encoder 2 and the Y-encoder 3 are converted into data on a Z-axis coordinate in response to the outputs from the switches, data about the Z-axis can be input. With this arrangement, the data input device can input Z-axis coordinate data which cannot be input by prior art track ball type data input devices.

7 Claims, 6 Drawing Sheets

DATA INPUT DEVICE

BACKGROUND OF THE INVENTION

1. Field of the Invention

The present invention relates to a data input device for inputting coordinate data for moving or rotating an image on a screen of a computer.

2. Description of the Related Art

Figure 7:
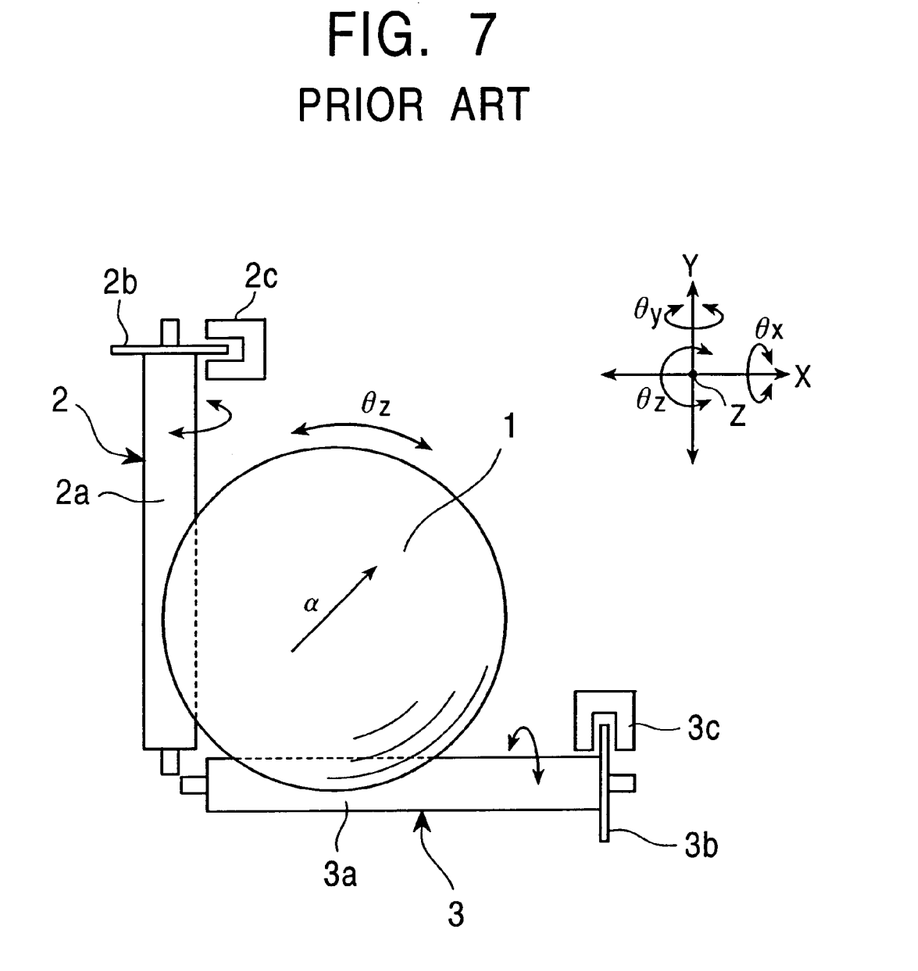
FIG. 7 shows a plan view showing a schematic structure of a conventional data input device.

FIG. 7 is a plan view showing a conventional data input device using a so-called track ball.

A spherical operating body 1 (hereinafter, referred to as a track ball) is supported to roll in three-dimensional directions and drives an X-encoder 2 and a Y-encoder 3.

The X-encoder 2 includes a roller 2a rotating about an axis extending in a Y-direction and a disc 2b rotating together with the roller 2a. Cutout portions and non-cutout portions are alternately formed to the outer periphery of the disc 2b at a predetermined pitch in a peripheral direction. A photocoupler 2c confronts the outer periphery of the disc 2b. The photocoupler 2c is provided with a light emitting element and a light receiving element disposed in confrontation with each other and the outer periphery of the disc 2b is interposed between the light emitting element and the light receiving element. When the roller 2a and the disc 2b rotate, a pulse output having a frequency in accordance with the rotational speed of the disc 2b can be obtained from the photocoupler 2c.

Likewise, the Y-encoder 3 is composed a roller 3a rotating about an axis extending in an X-direction, a disc 3b rotating together with the roller 3a and a photocoupler 3c confronting the outer periphery of the disc 3b. Cutout portions and non-cutout portions are alternately formed to the outer periphery of the disc 3b at a predetermined pitch In a peripheral direction. A pulse output having a frequency in accordance with the rotational speed of the disc 3b can be obtained from the photocoupler 3c.

An ordinary input operation when the data input device is connected to a computer will be described below.

When the track ball 1 is rolled in the X-direction, the roller 2a and the disc 2b of the X-encoder 2 are rotated and a pulse output is obtained from the photocoupler 2c and converted into coordinate data. When the coordinate data is input to the computer, a cursor, a character and an object are moved on a screen connected to the computer. Otherwise, when the track ball 1 is rolled in the Y-direction, the roller 3a and the disc 3b of the Y-encoder 3 are rotated and the pulse output from the photocoupler 3c is converted into coordinate data and the cursor and the like are moved on the screen in the Y-direction.

When the spherical operating body 1 is rolled in, for example, an α-direction which has an angle to both an X-axis and a Y-axis, both the roller 2a and the roller 3a are rotated, pulses from both the roller 2a and the 3a are converted into coordinate data and the cursor and the like are moved in the α-direction on the screen.

Further, it is possible to input rotation mode data as coordinate data by rolling the track ball 1 while depressing a predetermined key on a keyboard.

When a pulse output is obtained from the photocoupler 2c of the X-encoder 2 by rolling the track ball 1 in the X-direction while depressing the key, the pulse output is converted into rotation data on coordinates and input to the computer. As a result, the character and the object displayed on the screen are rotated about the Y-axis (in a θ y-direction). Likewise, when the track ball 1 is rolled in the Y-direction while depressing the above key, the character and the like are rotated about the X-axis (in a θ x-direction) on the screen.

That is, the character and the like on the screen are rotated in the same direction as the track ball 1. Therefore, when the track ball 1 is rolled in the α-direction, the character and the like are rotated about an axis orthogonal to the α-direction.

As described above, the data input device provided with the track ball 1, the X-encoder 2 and the Y-encoder 3 can input the coordinate data of a moving direction, a moving amount and a moving speed in two-dimension on X-Y coordinates. Further, the data input device can input rotation data about the Y-axis and rotation data about the X-axis in a coordinate rotation input mode. However, since the input coordinate data which can be input by the conventional data input device is limited to the data described above, the conventional data input device has a defect that it cannot input the following data.

When rotation data is input on the coordinates, rotation data about a Z-axis orthogonal to the X-axis and Y-axis cannot be input. That is, as described above, data can be input so that a character and the like are rotated on the screen in the same direction as the track ball by rolling the track ball 1 in the X-direction or in the Y-direction in the rotation mode through the predetermined key depressed. However, even if the track ball 1 is rolled in, for example, a θz-direction (a direction about the Z-axis) in FIG. 7, rotation data about the Z-axis cannot be input. That is, rolling of track ball 1 in the θz direction only results in the rotation of the X-encoder 2 and the Y-encoder caused by the component about the Y-axis and the component about the X-axis of the track ball. At the time, the character and the like only tend to rotate about the X-axis and the Y-axis in accordance with the output pulses from the encoders 2 and 3.

(2) In the input device shown in FIG. 7, moving data cannot be input in a Z-axis direction. Thus, it is impossible to input data for moving, the character and an object on the screen in a Z-direction (the inward and outward directions of the screen).

(3) The addition of a Z-encoder which rotates about the Z-axis permits the input of rotation data about the Z-axis and moving data in the Z-direction. However, it is difficult to rotate the Z-encoder by the track ball 1 with a pinpoint accuracy. That is, since the roller 2a of the X-encoder 2 and the roller 3a of the Y-encoder 3 are positioned below the spherical operating body 1, the track ball 1 is pressed in the Z-axis direction when it is rolled with a finger. With this arrangement, the rollers 2a and 3a can be reliably rotated by the track ball 1. However, it is difficult to reliably rotate the encoder whose axial direction is directed in the Z-axis direction by rolling the track ball with the finger.

Further, the provision of the Z-encoder makes it difficult to make the data input device thin because the size of the track ball in a thickness direction (Z-direction) is increased.

(4) As described above, the conventional input device cannot input coordinate data other than coordinate data based on the X-axis by means of the X-encoder and coordinate data other than coordinate data based on the Y-axis by means of the Y-encoder, likewise. Accordingly, the data input device provided with only the X-encoder 2 and the Y-encoder 3 cannot input three-dimensional data, although it can input two-dimensional data based on the X-Y coordinates as shown in FIG. 7.

An object of the present invention for solving the above problems of the conventional data input device is to provide a data input device capable of individually outputting two coordinate data using one encoder.

Another object of the present invention is to provide a data input device capable of inputting coordinate data in a two-dimensional direction and rotation data about respective three-dimensional axes.

SUMMARY OF THE INVENTION

A data input device according to the present invention comprises an operating body rolled manually; encoders for obtaining outputs in accordance with the rolling of the operating body; coordinate data creating means for creating coordinate data from the outputs from the encoders; and sensors for sensing that a hand is in touch with a peripheral portion of the operating body, wherein the coordinate data creating means outputs different coordinate data depending upon whether the sensors do not sense the hand in a state that the operating body is being rolled or the sensors sense the hand rolling the operating body.

The operating body is a spherical operating body called a track ball or a roller rotating about one axis. The sensors are a touch switch or a pressure sensitive switch whose sensing state is switched when a hand (finger) is in touch with it. Otherwise, the sensors may be composed of a light-emitting element for emitting light passing through a peripheral portion of the operating body and a light-receiving element for receiving the light. In this arrangement, when a finger touches the peripheral portion of the operating body, the light is shut off with the finger so that a sensing output is obtained.

In the present invention, when the operating body is operated with the finger in a state that the finger is not in touch with the peripheral portion thereof, coordinate data as to movement and speed in a specific direction or rotation data about a specific axis will be input to a computer or the like based on the rolling of the operating body. Whereas, when the operating body is operated with the finger in a state that the finger is in touch with the peripheral portion of the operating body, there will be obtained coordinate data as to movement and speed in a direction different from that of the above coordinate data or rotation data about an axis different from the above axis.

Accordingly, coordinate data of a different mode can be input by the same operating body by rolling the operating body in a state that it is not touched with the finger or rolling the operating body in a state that it is touched with the finger. According to the present invention, since the sensors disposed around the operating body and the operating body can be rolled while the finger touches the sensors, keys and the like need not be depressed with a hand other than the hand operating the operating body, which permits an input of a different mode to be controlled by one hand.

For example, when the sensors do not sense the hand in the state that the operating body is being rolled, the coordinate data creating means creates rotation data about a specific coordinate axis, whereas when it is sensed that the hand rolling the operating body is in touch with the sensors, the coordinate data creating means creates rotation data about a coordinate axis different from the above specific coordinate axis.

The above operating body is formed to a spherical shape and the data input device comprises an encoder for obtaining an output about an X-axis and an encoder for obtaining an output about a Y-axis in accordance with a rolling direction of the operating body. When the sensors do not sense the hand in the state that the operating body is being rolled, rotation data about the X-axis and the Y-axis are obtained from the coordinate data creating means, whereas when it is sensed that the hand rolling the operating body is in touch with the sensors, the data about the X-axis and the Y-axis are converted into rotation data about a Z-axis and output from the coordinate data creating means.

According to the above arrangement, it is possible for an input device having an X-encoder and a Y-encoder to input rotation data about the Z-axis. Since a Z-encoder which is orthogonal to the X-encoder and the Y-encoder need not be provided, the input device can be simply arranged as well as made thin in size.

In this case, there is provided sign inverting means for inverting a sign of outputs which are obtained from the encoders when the rotation data about the Z-axis is output from the coordinate data creating means and whose rotational direction is opposite to the rotational direction obtained up to that time to thereby permit the coordinate data creating means to output data having the same rotational direction about the Z-axis.

According to the above arrangement, when, for example, the operating body is continuously rolled in the same direction about the Z-axis, the X-encoder or the Y-encoder is revered while the operating body is being rolled, continuous rotation data about the Z-axis can be obtained even in such a case.

There are provided first and third sensors confronting each other across the operating body which the hand rolling the operating body is in touch with when the encoder for obtaining the output about the X-axis is in operation and second and fourth sensors confronting each other across the operating body which the hand rolling the operating body is in touch with when the encoder for obtaining the output about the Y-axis is in operation and the sign inverting means obtains an output having a different sign when the hand is in touch with the first sensor and when the hand is in touch with the third sensor as well as obtains an output having a different sign when the hand is in touch with the second sensor and when the hand is in touch with the fourth sensor.

In this case, when the operating body is rolled about the Z-axis and the finger successively touches the first, second, third and fourth sensors, continuous rotation data about the Z-axis will be input.

There are provided two operating bodies for rolling the same encoder and the sensors are disposed around one of the operating bodies and different coordinate data is output from the coordinate data creating means based on an encoder output when the hand is in touch with the sensors and an encoder output when the hand is not in touch with the sensors.

When, for example, the Y-encoder is rotated by both the above operating body and another roller-shaped operating body and the finger is in touch with the sensors at a time the another operating body is operated, the Y-encoder can input coordinate data as, for example, movement data in the Z-axis direction or rotation data about the Z-axis.

Different data can be input also in this case by means of the same encoder depending upon whether the finger is in touch with the sensors or not.

When the sensors do not sense the hand in the state that the track ball is being rolled, the coordinate data creating means creates moving data on X-Y coordinates, whereas when it is sensed that the hand rolling the operating body is in touch with the sensors, the coordinate data creating means creates screen scroll data based on the outputs from the encoders.

In this case, two encoders are disposed in directions orthogonal to each other and rotated by the operating body, two sets of the sensors are disposed around the operating body, and when one of the sensors senses the hand, the data creating means creates scroll data in a specific direction based on the output from one of the encoders, whereas when the other of the sensors senses the hand, the data creating means creates scroll data in a direction different from the above specific direction based on the output from the other of the encoders.

Further, two encoders are disposed in directions orthogonal to each other and rotated by the operating body, first, second, third and fourth sensors are sequentially disposed and when the first sensor or the third sensor senses the hand, the data creating means creates scroll data in a specific direction based on the output from one of the encoders, whereas when the second sensor or the fourth sensor senses the hand, the data creating means creates scroll data in a direction different from the above specific direction based on the output from the other of the encoders.

A displayed screen can be partially or entirely scrolled in an X-axis direction or in a Y-axis direction by causing any of the second sensor and the fourth sensor to sense the hand which is in touch therewith and rotating the encoder for obtaining the output about the X-axis or the encoder for obtaining the output about the Y-axis by rolling the operating body while maintaining the hand-touched state.

Further, when scroll is executed in a direction different from the direction of the scroll executed by the second and fourth sensors, that is, when scroll is executed in the Y-axis direction (longitudinal direction) by the second sensor or the fourth sensor by causing any of the first sensor and the third sensor to sense the hand which is in touch therewith and rotating the encoder for obtaining the output about the X-axis or the encoder for obtaining the output about the Y-axis by rolling the operating body while maintaining the hand-touched state, the first sensor or the third sensor can make scroll in the X-axis direction (lateral direction).

A data input device according to the present invention comprises an operating body as a operating body rolled manually; encoders for obtaining outputs in accordance with the rolling of the track body; coordinate data creating means for creating coordinate data from the outputs from the encoders; and sensors disposed around the operating body, wherein when it is sensed that a hand is in touch with the sensors, the coordinate data creating means creates coordinate data different from the coordinate data based on the outputs from the encoders.

In this case, the coordinate data creating means can create coordinate data about an X-axis and a Y-axis based on the outputs from the encoders and coordinate data about a Z-axis based on the outputs from the sensors.

When, for example, the first, second, third and fourth sensors capable of sensing the hand are sequentially disposed around the operating body, rotation data about the Z-axis can be output by successively touching the first, second, third and fourth sensors with the hand.

Further, rotation data about the Z-axis in a direction opposite to the above rotation data can be obtained by successively touching the sensors with the hand to in a direction opposite to the above direction.

As described above, the rotation data about the Z-axis can be output using the encoders for obtaining the outputs about the X-axis and the Y-axis and the low cost sensors.

DESCRIPTION OF THE PREFERRED EMBODIMENT

Figure 1:
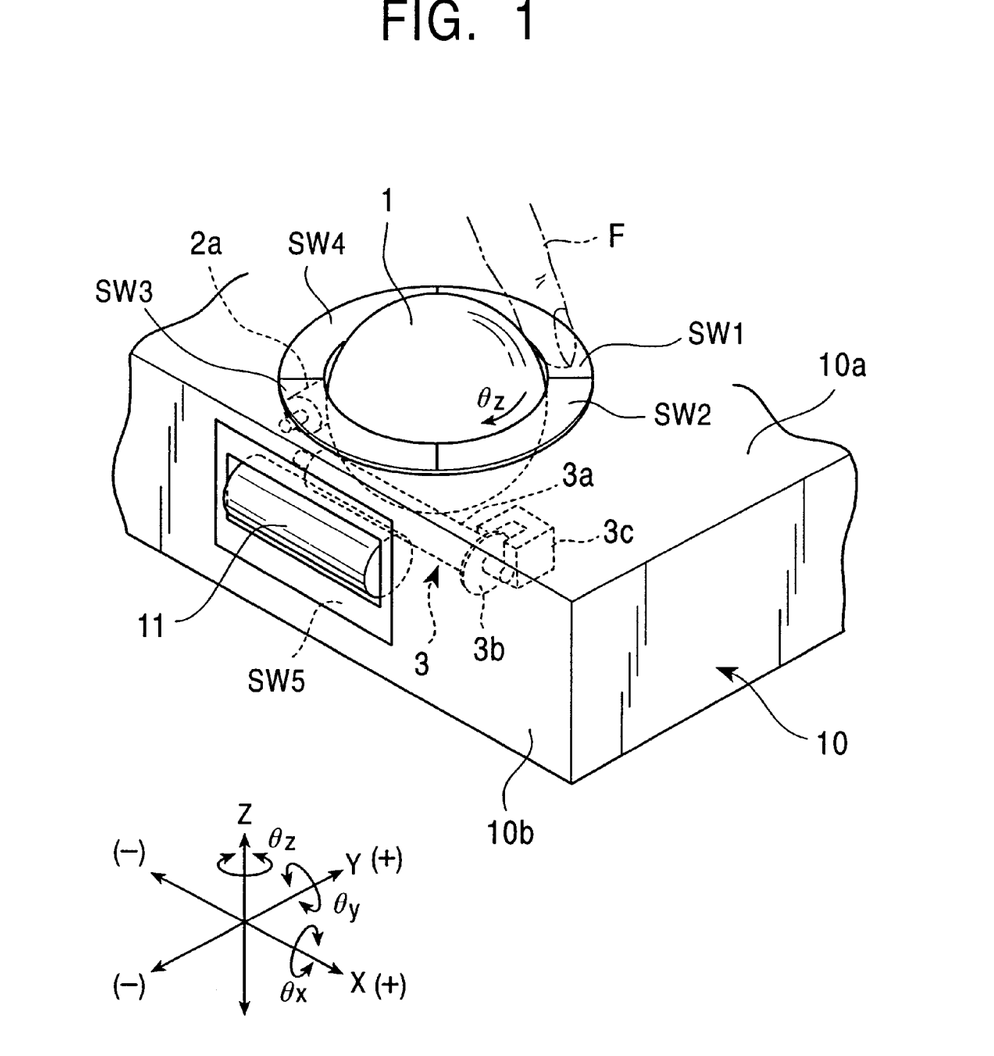
FIG. 1 is a partial perspective view of a data input device of the present invention.
Figure 2:
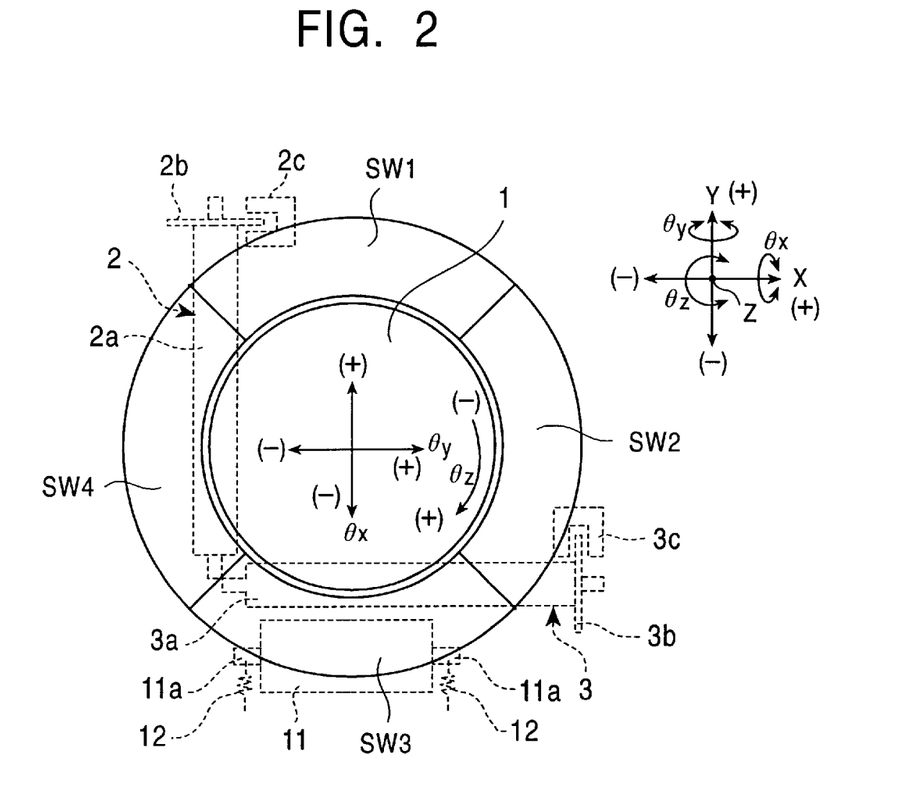
FIG. 2 is a plan view of the data input device.
Figure 3:
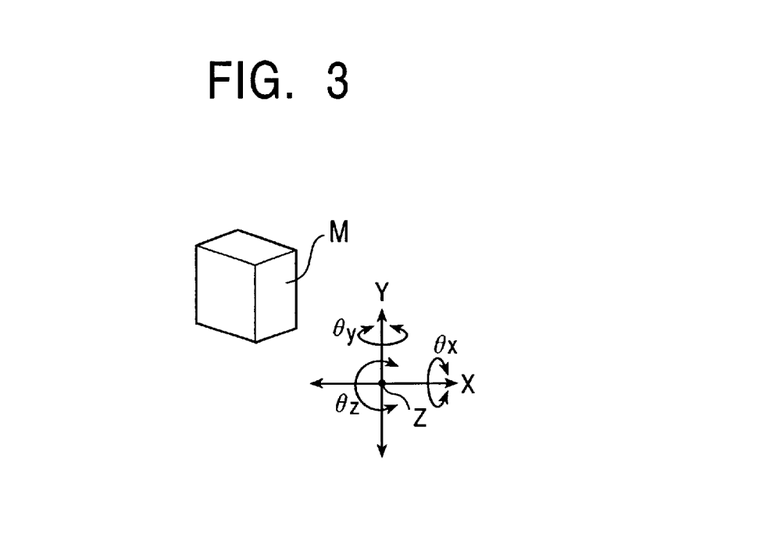
FIG. 3 is a view describing an example of an image displaying operation executed on a screen by an input through the data input device.
Figure 5:
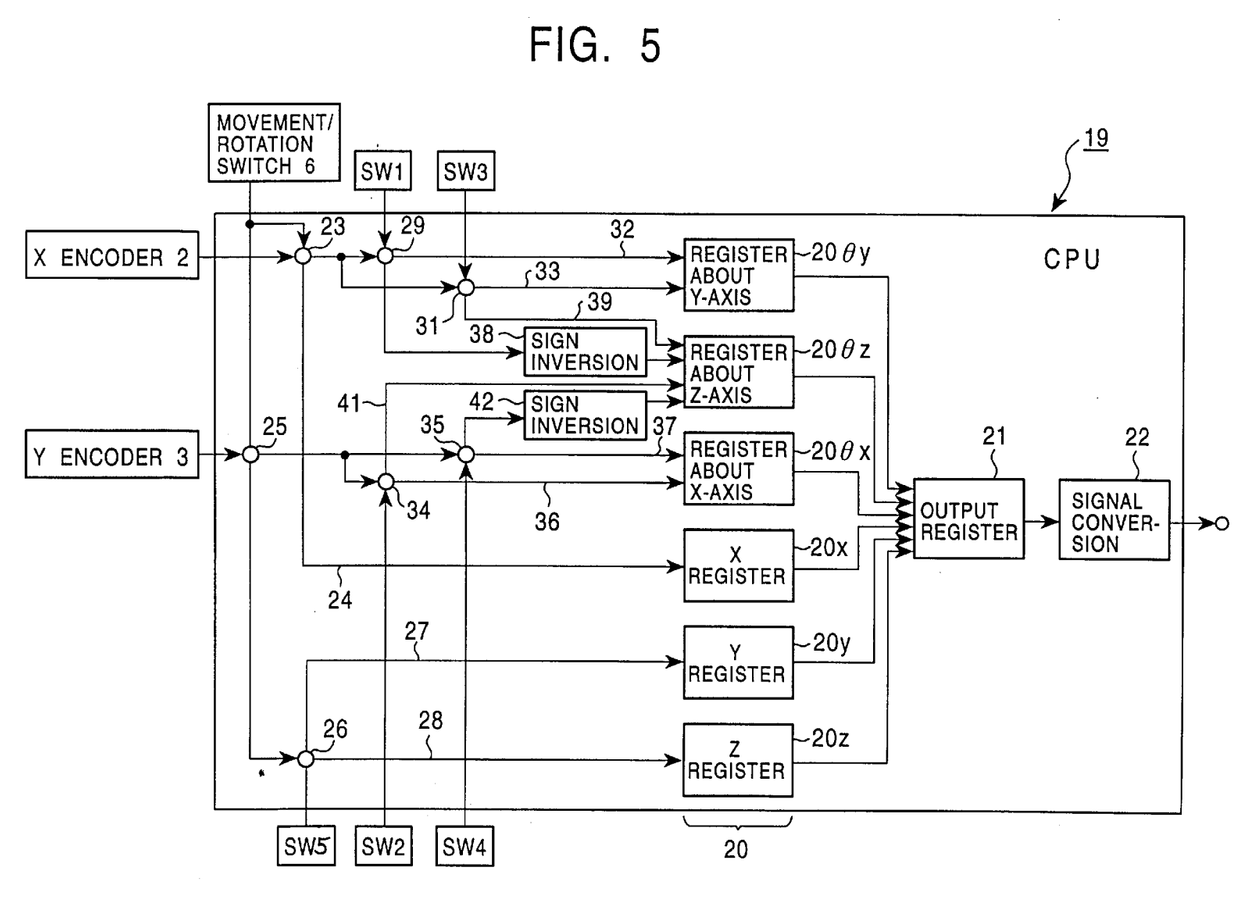
FIG. 5 is a block diagram showing an example of a circuit arrangement.

FIG. 1 is a perspective view showing a data input device of the present invention, FIG. 2 is a plan view thereof, FIG. 3 is a front elevational view showing an example of an image on a screen of a display unit connected to a computer and FIG. 5 is a block diagram showing a circuit arrangement of the data input device.

Numeral 10 shown in FIG. 1 denotes a body case of the data input device. The body case 10 may be arranged as a keyboard case, although it can be arranged independently of a keyboard.

A spherical operating body or a track ball 1 is supported so that it can be rolled in respective directions about an X-direction, a Y-direction and a Z-direction. The track ball 1 has a spherical equatorial line positioned below the surface 10a of the body case 10. When the track ball 1 is rolled with a finger F, the finger F touches the track ball 1 at a portion thereof above the equatorial line.

The data input device has an X-encoder 2 and a Y-encoder 3 likewise the conventional example shown in FIG. 7. The X-encoder 2 is composed of a roller 2a, a disc 2b having an outer periphery to which cutouts are formed at a predetermined pitch and a photocoupler 2c confronting the outer periphery of the disc 2b. The Y-encoder 3 is composed of a roller 3a, a disc 3b having an outer periphery to which cutouts are formed at a predetermined pitch and a photocoupler 3c likewise the X-encoder 2.

When the track ball 1 is rolled with the finger F, the roller 2a and/or the roller 3a is rotated by the track ball 1 and a pulse output can be obtained from the roller 2a and/or the roller 3a in accordance with the rotational speed thereof. Two sets of light emitting elements and light receiving elements are provided with each of the photocoupler 2c and the photocoupler 3c to sense the above cutouts. The cutout sensing phase of the first set of the light emitting element and the light receiving element is displaced from that of the second set of the light emitting element and the light receiving element so that they can sense the rotational directions of the rollers 2a and 3a. In addition, pulse outputs having frequencies in accordance with the rotational speeds of the rollers 2a and 3a can be obtained from the photocouplers 2c and 3c.

Contact sensing type or pressure sensing type touch switches SW1, SW2, SW3 and SW4 are disposed on the surface 10a of the body case 10 around the outer periphery of the track ball 1 as first, second, third and fourth sensors. As shown in FIG. 1, the respective switches SW1, SW2, SW3 and SW4 are disposed in the proximity of the peripheral edge of the track ball 1 so that the finger F touches the switches when it applies a rolling force to the peripheral edge of the track ball 1. Therefore, when the track ball 1 is rolled in a θz-direction about the Z-axis by touching the peripheral edge of the track ball 1 with the finger F, the finger F successively touches the switches SW1, SW2, SW3 and SW4 as shown in FIG. 1.

As shown in FIG. 1, another roller-shaped operating body or a track roller 11 is disposed to a side 10b of the body case. The track roller 11 is disposed so that it can rotate about an axis 11a extending in an X-axis direction. The track roller 11 is urged in a Y(−)-direction by springs 12, 12 and a portion thereof protrudes from the side 10b so that it can be operated.

When the track roller 11 is rotated while depressing the portion thereof protruding from the side 10b with the finger F, the roller 3a of the Y-encoder 3 is rotated by the track roller 11.

As shown in FIG. 1, a contact sensing type or pressure sensing type touch switch SW5 is disposed to the side 10b of the body case 10 so as to surround the periphery of the track roller 11. The track roller 11 slightly protrudes from the side 10b of the body case 10 and the switch SW5 is disposed in the proximity of the track roller 11. Thus, when the track roller 11 is operated with the finger F, the finger F inevitably touches the switch SW5.

The circuit arrangement shown in FIG. 5 will be described.

Figure 6:
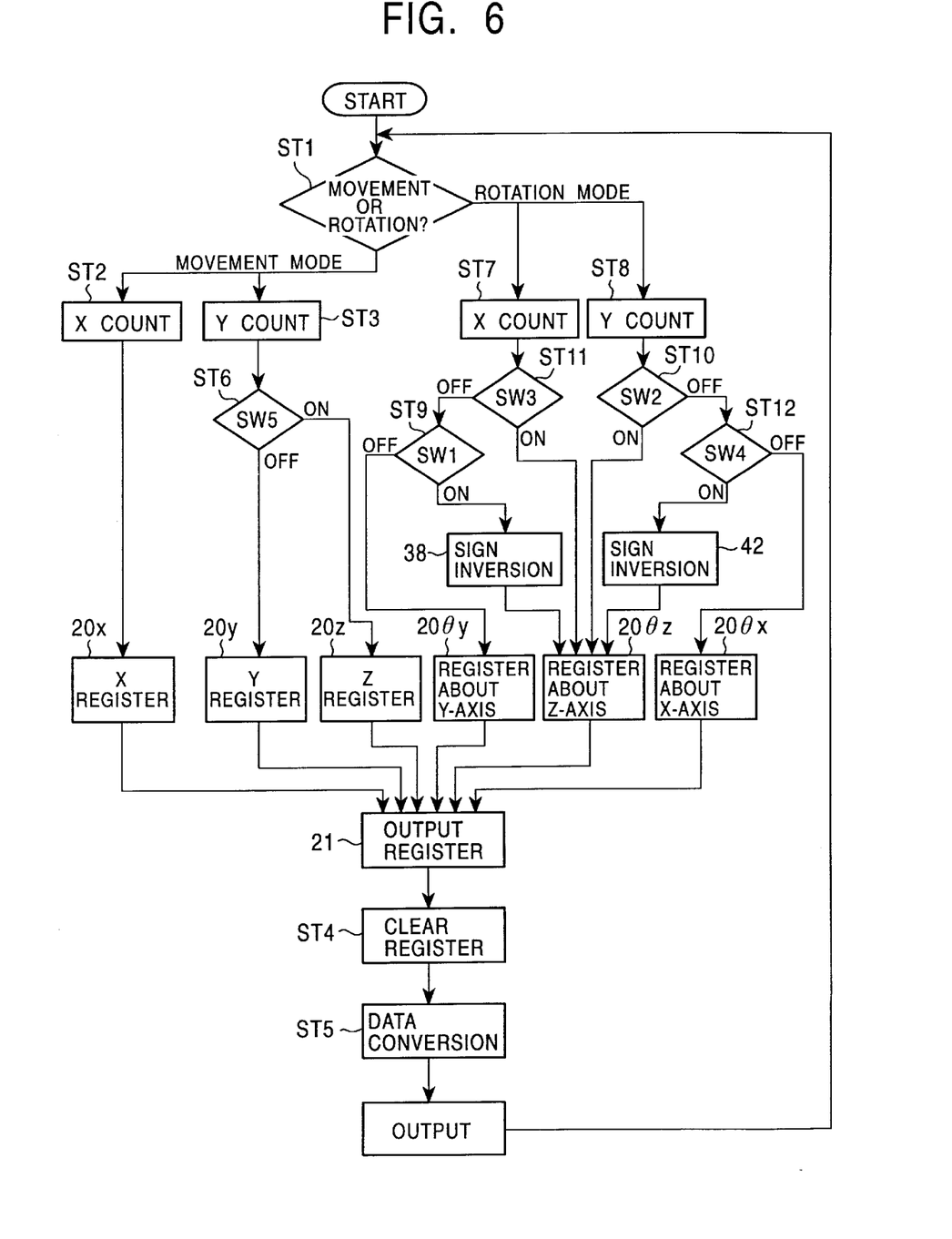
FIG. 6 shows an operation flowchart.

In the embodiment, the pulse outputs supplied from the X-encoder 2 and the Y-encoder 3 are subjected to waveform shaping and directly input to a CPU 19 of a computer. The sensing outputs supplied from the touch switches SW1, SW2, SW3 and SW4 are also input to the CPU 19 through a predetermined interface. Further, a movement/rotation switch SW6 shown in FIG. 6 is a predetermined key disposed on, for example, the keyboard. The switching signal therefrom is also input to the CPU 19.

The respective signals input to the CPU 19 are processed by preset software. FIG. 5 shows the process by the circuit arrangement in place of the software. Therefore, a circuit as shown in the block diagram of FIG. 5 may be arranged on a board.

In the circuit block diagram shown in FIG. 5, the pulse outputs supplied from the X- and Y-encoders 2, 3 are input to any ones of the registers of a register group 20 and further sent from an output register 21 to a signal converter 22. The pulse outputs are converted into coordinate data, that is, into moving data or rotation data on coordinates by the signal converter 22 and sent to an image processing unit. Therefore, a coordinate data creating unit is composed of the register group 20, the output register 21 and the signal converter 22 in this arrangement.

The pulse output supplied from the photocoupler 2c of the X-encoder 2 is sent to a switching unit 23. When the movement/rotation switch SW6 is in a movement mode (in general, when a predetermined key on the keyboard is not depressed), the above pulse output is supplied to an X-register 20x through a line 24 so that movement data in the X-axis direction is input.

The pulse output supplied from the Y-encoder 3 is sent to a switching unit 25. When the movement/rotation switch SW6 is in the movement mode on the coordinates, the pulse output is supplied to a switching unit 26. When the touch switch SW5 does not sense the finger F in the switching unit 26, the pulse output is supplied to a Y-register 20y through a line 27 so that movement data in a Y-axis direction is input.

When the track ball 1 is not operated and the track roller 11 is operated in palace of it and the roller 3a of the Y-encoder 3 is rotated thereby, the finger F is in touch with the touch switch SW5. Thus, the pulse output supplied from the Y-encoder 3 is sent to a Z-register 20z through the switching unit 26 so that movement data in a Z-axis direction is input on the coordinates.

When the movement/rotation switch SW6 is in a rotation input mode (for example, a predetermined key on the keyboard is depressed), the pulse output supplied from the X-encoder 2 is sent to switching units 29 and 31. When the finger F is not in touch with the touch switches SW1 and SW3, the pulse output is supplied to a register 20θy about the Y-axis from through a line 32 or 33 and rotation data about the Y-axis is input as coordinate data.

Likewise, when the movement/rotation switch SW6 is in the rotation mode, the pulse output supplied from the Y-encoder 3 is sent to switching units 34 and 35. When the finger F is not in touch with the touch switches SW2 and SW4, the above pulse output is supplied to a register 20θx about the X-axis through a line 36 or 37 so that rotation data about the X-axis is input as coordinate data.

When the finger F is in touch with the touch switch SW1, the pulse output supplied from the X-encoder 2 is switched by the switching unit 29, sent to a register 20θz about the Z-axis through a sign inverting unit 38 so that rotation data about the Z-axis is input as coordinate data. When the finger F is in touch with the switch SW3, the pulse output supplied from the X-encoder 2 is sent to the register 20θz about the Z-axis from the switching unit 31 through a line 39 without the sign thereof inverted.

Likewise, when the finger F is in touch with the touch switch SW2, the pulse output supplied from the Y-encoder 3 is switched by the switching unit 34 and sent to the register 20θz about the Z-axis through a line 41 so that rotation data about the Z-axis is input. Further, when the finger F is in touch with the touch switch SW4, the pulse output supplied from the Y-encoder 3 is switched by the switching unit 35 and sent to the register 20θz about the Z-axis through a sign inverting unit 42.

That is, when the finger F is in touch with the switch SW1 as a first sensor and the switch SW3 as a second sensor, the pulse output supplied from the X-encoder 2 is converted into the rotation data about the Z-axis. At the time, however, the sign of the pulse output from the X-encoder 2 when the finger F is in touch with the switch SW1 is made opposite to the sign of the pulse output therefrom when the finger F is in touch with the switch SW3. That is, even if the rotating direction of the roller 2a is changed, the pulse output from the X-encoder 2 is supplied to the register 20θz about the Z-axis as a rotation pulse output in the same direction.

Likewise, the sign of the pulse output supplied from the Y-encoder 3 when the finger F is in touch with the touch switch SW2 is made opposite to the sign of the pulse output therefrom when the finger F is in touch with the switch SW4. Thus, even if the rotating direction of the roller 3a is changed, the pulse output is supplied to the register 20θz about the Z-axis as a rotation pulse output in the same direction.

As mentioned above, when the finger F touches a peripheral portion of the track ball 1 and rolls the track ball 1 clockwise about the Z-axis (in a θz(+)- direction) and at the time the finger F successively touches the switches SW1, SW2, SW3 and SW4, the rotation data about the Z-axis is output from the register 20θz about the Z-axis as shown in FIG. 1. That is, when the finger F touches the peripheral portion of the track ball 1 and rolls the track ball 1 in the θz-direction, the finger F rolls the track ball 1 at a portion thereof above the equatorial line. With this operation, since the track ball 1 is provided with a θx rolling component about the X-axis and/or a θy rolling component about the Y-axis, the rotation data about the Z-axis can be output making use of the pulse output from the X-encoder 2 and the pulse output from the Y-encoder 3 at the time.

When the finger F is in touch with the switch SW1, the roller 2a is rotated in a θy(−)-direction by the rolling component of the track ball 1 in a θy(+)-direction. When the finger F reaches the switch SW3 in this state, however, the roller 2a is reversed in the θy(+)-direction by the rolling component of the track ball 1 in the θy(−)-direction. At the time, so long as the track ball 1 continuously rolls in the θz(+)-direction, a pulse output as if the X-encoder 2 rotated in the above direction can be supplied to the register 20θz by inverting the sign of the pulse output from the X-encoder 2 when the finger F is in touch with the switch SW1.

This is also applicable to the Y-encoder 3. When the finger F is in touch with the switch SW2 and rolls the track ball 1 in the θz(+)-direction, the roller 3a is rotated in a θx(+)-direction by the rolling component of the track ball 1 in a θx(−)-direction. When the finger F reaches the switch SW4, the roller 3a is reversed in the θx(−)-direction by the rolling component of the track ball 1 in the θx(+)-direction. At the time, a pulse output as if the Y-encoder 3 rotated in the same direction can be supplied to the register θz at all times in such a manner that the sign of the pulse output supplied from the X-encoder 3 when the finger F is in touch with the switch SW2 is made opposite to the sign of the pulse output therefrom when the finger F is in touch with the switch SW4.

Therefore, when the finger F is in touch with the peripheral portion of the track ball 1 and continuously rolls the track ball 1 clockwise about the Z-axis and the finger F successively touches the switches SW1, SW2, SW3 and SW4, the pulse outputs from the X- and Y-encoder 2 and 3 can be supplied to the register 20θz as clockwise continuous rotation data in the Z-axis at all times.

This is also applicable to a case that the track ball 1 is rolled counterclockwise (in a θz(−)-direction) about the Z-axis.

Next, an operation of the data input device will be described with reference to the flowchart shown in FIG. 6.

FIG. 3 shows a screen of a display unit connected to the computer. In the following description, coordinate data input in the respective modes will be described in correspondence to a moving motion and a rotating motion of an object M displayed on the screen.

(Input in movement mode)

In the movement mode, the movement/rotation switch SW6 is set the movement mode and this is, for example, a case that the track ball 1 or the track roller 11 is operated without depressing the predetermined key on the keyboard (step 1; ST1).

When the track ball 1 is rolled in any direction, only the roller 2a of the X-encoder 2 is rotated or only the roller 3a of the Y-encoder 3 is rotated. Otherwise, both of the rollers 2a and 3a are rotated.

The pulse output supplied from the X-encoder 2 (ST2) is sent to the X resister 20x through the line 24 as it is and loaded on the output register 21. At step 4 (ST4), the respective registers of the register group 20 are cleared (reset), the pulse output is converted into coordinate data by the signal conversion unit 22 (ST5), output as movement data on the X-coordinate and input to the image processing unit of the computer.

Since the finger F is not in touch with the switch SW5 when the track ball 1 is rolled, the switch SW5 is turned OFF at step S6 (ST6). Therefore, the pulse output supplied from the Y-encoder 3 (ST6) is sent to the Y- register 20y, loaded on the output register 21 likewise and supplied as the movement data on the Y-coordinate.

Accordingly, the object M on the screen shown in FIG. 3 moves within the X-Y coordinate plane along the screen in accordance with the rotational direction of the track ball 1 in this case.

Next, a case that the track roller 11 is operated without operating the track ball 1 will be described. Since the finger F is in touch with the touch switch SW5 to thereby turn ON it at the time, the pulse output supplied from the Y-encoder 3 is sent from the switching unit 26 to the Z-register 20z, output as the movement data on the Z-coordinate and supplied to the image processing unit. At the time, the object M moves in the Z-direction (the inward direction) on the screen shown in FIG. 3.

(Input in rotation mode)

In the rotation mode, data is input by rolling the track ball 1. At the time, the movement/rotation switch SW6 is switched to the rotation mode by rolling the track ball 1 while pressing the predetermined key on the keyboard at step 1 (ST1).

When the track ball 1 is rolled without touching the switches SW1, SW2, SW3, SW4 and SW5 with the finger F, the roller 2a of the X-encoder 2 or the roller 3a of the Y-encoder 3 is rotated or both of the roller 2a and the roller 3a are rotated.

The pulse output supplied from the X-encoder 2 when it is rotated in the θy-direction (ST7) is sent to the register 20θy about the Y-axis as it is. The pulse output supplied from the X-encoder 3 when it is rotated in the θx-direction (ST8) is sent to the register 20θx about the X-axis as it is. The output from the Y-register 20θy and/or the output from the X-register 20θx is converted into the coordinate data about the Y-axis or the X-axis (ST5) by the signal converter 22 and supplied to the image processing unit. As a result, the object M on the screen in FIG. 3 is rotated in the θy-direction, the θx-direction or a direction obtained by synthesizing θy and θx.

Next, the track ball 1 is rolled by the finger F in, for example, the θz(+)-direction about the Z-axis while the finger F is in touch with the outer peripheral portion of the track ball 1, data about the Z-axis can be obtained.

When the track ball 1 is rolled in the θz(+)-direction in a state that the finger F is in touch with the switch SW1, the track ball 1 is provided with a rotational component in the θy(+)-direction. That is, since a force in the θz(+)-direction is imposed on the track ball 1 while the finger F is in touch with the track ball 1 at a portion above the equatorial line thereof, the track ball 1 is rolled in the θz(+)-direction as well as provided with a rotational component in the θy(+)-direction. The roller 2a is rotated thereby in the θy(−)-direction. As a result, the sign of the pulse output supplied from the X-encoder 2 is inverted by the sign inverting unit 38 at step 9 (ST9) of FIG. 6 and loaded on the register 20θz about the Z-axis. When the finger F gets in touch with the switch SW2, the roller 3a is rotated in the θx(+)-direction by the rotational component of the track ball 1 in the θx(−)-direction. At the time, however, the pulse output supplied from the Y-encoder 3 is sent from step ST10 to the register 20θz about the Z-axis with the sign thereof not inverted.

When the finger F gets in touch with the switch SW3, the roller 2a is reversed in the θy(+)-direction by the rotational component of the track ball 1 in the θy(−)-direction this time. At the time, the pulse output supplied from the X-encoder 2 is sent to the register 20θz about the Z-axis from step ST11 with the sigh thereof not inverted. Further, when the finger F gets in touch with the switch SW4, the roller 3a is rotated in the θx(−)-direction by the rotational component of the track ball 1 in the θx(+)-direction. At the time, the pulse output supplied from the Y-encoder 3 is sent to the register 20θz about the Z-axis with the sign thereof inverted by the sign inverting unit 42.

Therefore, when the track ball 1 is rolled in the θz-direction while successively touching the switches SW1, SW2, SW3 and SW4 with the finger F, the rotation data about the Z-axis can be output by a data conversing operation at step ST5 and the object M is rotated in the θz direction on the screen shown in FIG. 3.

Next, in the arrangement shown in FIG. 2, the roller 3a of the Y-encoder 3 is located at a position where it is always in contact with a lower portion of the track ball 1, Thus, the track ball 1 is abutted against the roller 3a only when the track roller 11 is operated. Therefore, when the roller 3a is rotated by the track ball 1, the track roller 11 is not rolled. When the roller 3a is rotated by the track roller 11, however, the track ball 1 may be rolled together therewith.

Figure 4A:
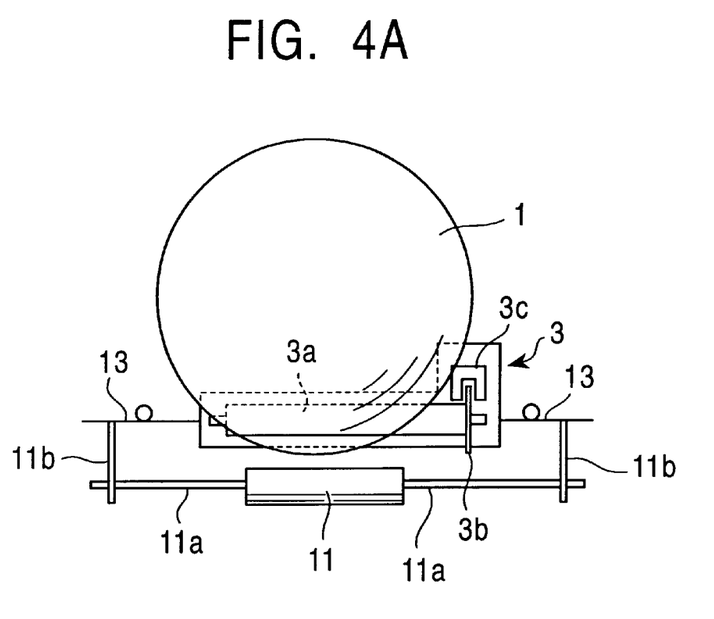
FIGS. 4A and 4B are plan views showing a support structure and operation of other operating body.
Figure 4B:
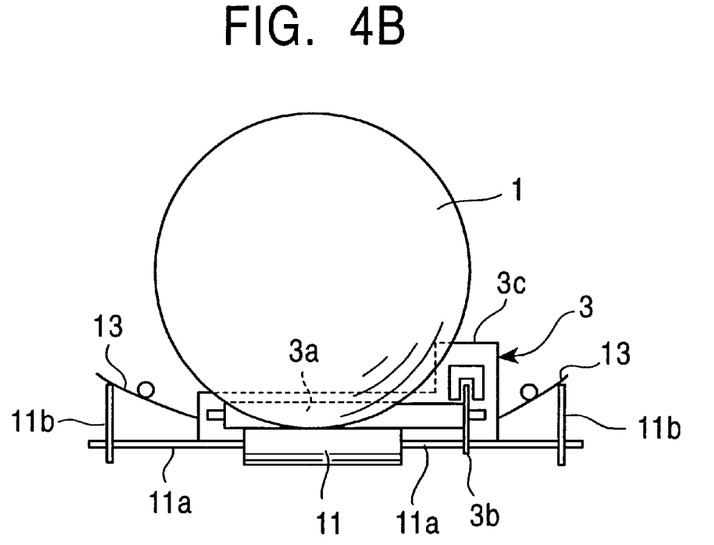

FIGS. 4A and 4B show an example in which the above point is improved. Springs 13 such as leaf springs or wire springs extend to both the sides of the Y-encoder 3 composed of the roller 3a, the disc 2b and the photocoupler 2c. Support members 11b for supporting the shaft 11a of the track roller 11 are abutted against both the ends of the springs 13.

In FIG. 4A, since the track roller 11 is not depressed, the roller 3a comes into contact with the track ball 1. When the track roller 11 is depressed and rolled as shown in FIG. 4B, however, the springs 13 are bent because both the ends thereof are depressed by the support members 11b, 11b and the Y-encoder 3 is moved downward as a whole. Thus, the roller 3a is separated from the track ball 1 as well as the track roller 11 comes into contact with the roller 3a. Therefore, the roller 3a can be rotated by the track roller 11 as well as the roller 3a can be separated from the track ball 1 in FIG. 4B.

Further, another input operation can be executed by means of the data input device shown in FIG. 1.

That is, the track ball 1 is rolled in the θx-direction while keeping a state that the finger F gets in touch with any of the touch switches SW2 and SW4 formed to the periphery of the track ball 1 and is sensed (a switch-ON state). At the time, the rotational output of the Y-encoder 3 in the θx-direction is converted into Y-direction scroll data by a coordinate data creating unit composed of the registers and the signal converting unit. Accordingly, a displayed screen can be partly or entirely scroll in the Y-axis direction (longitudinal direction).

The track ball 1 is rolled in the θy-direction while keeping a state that the finger F gets in touch with any of the touch switches SW1 and SW3. At the time, the rotational output of the X-encoder 2 in the θy-direction is converted into X-direction scroll data by the coordinate data creating means. Accordingly, the displayed screen can be partly or entirely scroll in the X-axis direction (lateral direction).

When the finger F is not in touch with any of the touch switches, the movement data on the X-Y coordinates or the rotation coordinate data about the X- or Y-axis is created by the rotational output of the X-encoder 2 or the Y-encoder 3 as described above.

The scroll data in the X-direction may be created when the track ball 1 is rolled in the θy direction in a state that the finger F is in touch with the touch switch SW1 or SW3 and the scroll data in the Y-direction may be created when the finger F is in touch with the touch switch SW2 or SW4.

As described above, when a screen is, for example, a document input screen, the screen can be moved in a document head or document tail direction or a line head or line tail direction only by rolling the track ball 1 by depressing the predetermined switch.

The scroll function can be added by changing a program of the driver software for controlling the data input device.

When the switches SW1 and switch SW3 are arranged as a pair and the switches SW2 and switch SW4 are arranged as a pair as shown in FIG. 1 and FIG. 2, users can make operation using any of a right hand and a left hand and a right-handed user and a left-handed user can make scroll operation, respectively. Only the provision of the touch switches SW2 and SW3 without the touch switches SW1 and SW4 permits the scroll operations in the X- and Y-directions to be executed as described above.

The addition of the scroll function can be realized by adding scrolling registers for the X- and Y-axis directions to the register group 20 or replacing existing registers with other registers in the circuit arrangement shown in FIG. 5 and the flowchart shown in FIG. 6.

Further, the rotation data about the Z-axis described above can be input by another method.

That is, the rotation data about the Z-axis can be input by means of only the touch switches SW1, SW2, SW3 and SW4 disposed around the track ball 1.

For example, clockwise rotation data can be output to the Z-axis by successively touching the touch switches SW1, SW2, SW3 and SW4 with the finger F without rolling the track ball 1. On the contrary, counterclockwise rotation data can be output to the Z-axis by successively touching the touch switches SW4, SW3, SW2 and SW1 with the finger F.

Further, the touch switches may be further minutely subdivided to obtain the rotation data about the Z-axis.

In addition, ring-shaped membrane switches and touch sensors may be provided in place of the touch switches SW1, SW2, SW3 and SW4 in order to minutely sense positions which the finger F gets in touch with about the Z-axis.

As described above, according to the present invention, different coordinate data can be input depending upon whether the hand is in touch with the sensors located around the track ball or not. Accordingly, the same encoders can be used for the inputs in a plurality of modes, by which the structure of the data input device can be simplified. Further, the data input device provided with the X-encoder and the Y-encoder can also input data as to the three-dimensional coordinates.

What is claimed is:

1. A data input device comprising:

an operating body rolled manually;

encoders for obtaining outputs in accordance with the rolling of said operating body;

coordinate data creating means for creating coordinate data from the outputs from said encoders; and sensors for sensing that a hand is in touch with a peripheral portion of said operating body, wherein said coordinate data creating means outputs different coordinate data depending upon whether said sensors do not sense the hand in a state that the operating body is being rolled or said sensors sense the hand rolling said operating body, wherein when said sensors do not sense the hand in the state that the operating body is being rolled, said coordinate data creating means creates rotation data about a specific coordinate axis, whereas when it is sensed that the hand rolling said operating body is in touch with said sensors, said coordinate data creating means creates rotation data about a coordinate axis different from the above specific coordinate axis, wherein said operating body is formed to a spherical shape and said data input device comprises an encoder for obtaining an output about an X-axis and an encoder for obtaining an output about a Y-axis in accordance with a rolling direction of said spherical operating body, wherein when said sensors do not sense the hand in the state that said operating body is being rolled, rotation data about the X-axis and the Y-axis are obtained from said coordinate data creating means, whereas when it is sensed that the hand rolling said operating body is in touch with said sensors, the data about the X-axis and the Y-axis are converted into rotation data about a Z-axis and output from said coordinate data creating means.

2. A data input device according to claim 1, comprising sign inverting means for inverting a sign of outputs which are obtained from said encoders when the rotation data about the Z-axis is output from said coordinate data creating means and whose rotational direction is opposite to the rotational direction obtained up to that time to thereby permit said coordinate data creating means to output data having the same rotational direction about the Z-axis.

3. A data input device according to claim 2, comprises:

first and third sensors confronting each other across said spherical operating body which the hand rolling said operating body is in touch with when said encoder for obtaining the output about the X-axis is in operation; and second and fourth sensors confronting each other across said spherical operating body which the hand rolling said operating body is in touch with when said encoder for obtaining the output about the Y-axis is in operation, wherein said sign inverting means obtains an output having a different sign when the hand is in touch with said first sensor and when the hand is in touch with said third sensor as well as obtains an output having a different sign when the hand is in touch with said second sensor and when the hand is in touch with said fourth sensor.

4. A data input device comprising:

an operating body rolled manually;

encoders for obtaining outputs in accordance with the rolling of said operating body;

coordinate data creating means for creating coordinate data from the outputs from said encoders;

sensors for sensing that a hand is in touch with a peripheral portion of said operating body, and two operating bodies for rolling the same encoder, wherein said sensors are disposed around one of said operating bodies and different coordinate data is output from said coordinate data creating means based on an encoder output when the hand is in touch with said sensors and an encoder output when the hand is not in touch with said sensors, wherein said coordinate data creating means outputs different coordinate data depending upon whether said sensors do not sense the hand in a state that the operating body is being rolled or said sensors sense the hand rolling said operating body.

5. A data input device comprising:

an operating body rolled manually;

encoders for obtaining outputs in accordance with the rolling of said operating body;

coordinate data creating means for creating coordinate data from the outputs from said encoders; and sensors for sensing that a hand is in touch with a peripheral portion of said operating body, wherein said coordinate data creating means outputs different coordinate data depending upon whether said sensors do not sense the hand in a state that the operating body is being rolled or said sensors sense the hand rolling said operating body wherein when said sensors do not sense the hand in the state that said operating body is being rolled, said coordinate data creating means creates moving data on X-Y coordinates, whereas when it is sensed that the hand rolling said operating body is in touch with said sensors, said coordinate data creating means creates screen scroll data based on the outputs from said encoders.

6. A data input device according to claim 5, wherein two encoders are disposed in directions orthogonal to each other and rotated by said operating body, two sets of said sensors are disposed around said operating body, and when one of said sensors senses the hand, said data creating means creates scroll data in a specific direction based on the output from one of said encoders, whereas when the other of said sensors senses the hand, said data creating means creates scroll data in a direction different from the above specific direction based on the output from the other of said encoders.

7. A data input device according to claim 5, wherein two encoders are disposed in directions orthogonal to each other and rotated by said operating body, first, second, third and fourth sensors are sequentially disposed and when said first sensor or said third sensor senses the hand, said data creating means creates scroll data in a specific direction based on the output from one of said encoders, whereas when said second sensor or said fourth sensor senses the hand, said data creating means creates scroll data in a direction different from the above specific direction based on the output from the other of said encoders.

* * * * *